United States Patent
Brown (10) Patent No.: US 9,759,203 B2
(45) Date of Patent: Sep. 12, 2017

(54) INTEGRATED SPRING AND INDUCTION COIL FOR SHAPE-MEMORY ALLOY (SMA) APPARATUS

(71) Applicant: The Boeing Company, Chicago, IL (US)

(72) Inventor: Jonathan K. Brown, Renton, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 14/741,361

(22) Filed: Jun. 16, 2015

(65) Prior Publication Data

US 2016/0369784 A1    Dec. 22, 2016

(51) Int. Cl.
*F03G 7/06* (2006.01)

(52) U.S. Cl.
CPC .................................. *F03G 7/065* (2013.01)

(58) Field of Classification Search
CPC ........ F03G 7/06; F03G 7/065; F16D 2121/32; F16D 2121/34; F16D 2129/14
See application file for complete search history.

(56) References Cited

U.S. PATENT DOCUMENTS 5,127,228 A * 7/1992 Swenson ................. F03G 7/065
                                                              60/527

FOREIGN PATENT DOCUMENTS

DE      19817399 A1 * 11/1998
JP      61116078 A  *  6/1986  ............. F03G 7/065

* cited by examiner

*Primary Examiner* — Jonathan Matthias
(74) *Attorney, Agent, or Firm* — Duft Bornsen & Fettig LLP (57) ABSTRACT

Apparatus that use Shape-Memory Alloy (SMA) materials. An exemplary apparatus includes an SMA member that transforms between a first shape and a second shape based on temperature. The apparatus also includes a coil spring that encompasses the SMA member. The coil spring conducts current from a power source to generate a magnetic field that induces heat in the SMA member. The coil spring also stores mechanical energy as the SMA member transforms from the first shape to the second shape when heated to a transition temperature, and exerts force on the SMA member from the mechanical energy to assist the SMA member in transforming from the second shape to the first shape when cooling below the transition temperature.

22 Claims, 5 Drawing Sheets

INTEGRATED SPRING AND INDUCTION COIL FOR SHAPE-MEMORY ALLOY (SMA) APPARATUS

FIELD

This disclosure relates to the field of shape-memory materials.

BACKGROUND

Shape-memory alloys (SMA) are strong-lightweight alloys that can be programmed to remember different shapes at different temperatures. SMAs, such as Nickel-Titanium (Ni—Ti), display two distinct crystal structures or phases. Martensite form exists at lower temperatures, and austenite form exists at higher temperatures. When an SMA is in martensite form at lower temperatures, it can be easily formed to a desired shape. When the SMA is in austenite form at higher temperatures, it can be "trained" to transition into another shape. For example, the SMA may be bent, squeezed, twisted, or otherwise formed to have a different shape when in the austenite form. The SMA when heated will transition from its low-temperature (martensite) shape to its high-temperature (austenite) shape. When heat is removed and the SMA cools, the SMA may be trained to transition back from its high-temperature shape to its low-temperature shape.

SMAs have applications in many different areas, such as aircraft and aerospace. Manufacturers continue to look for improved ways of using SMAs.

SUMMARY

Embodiments described herein include a coil spring that assists an SMA member in transitioning between shapes. The coil spring encompasses the SMA member in a coil-over configuration. With this configuration, the coil spring is multi-purpose in that it acts as a mechanical spring to apply force to the SMA member when changing shapes, and also acts as an induction coil to induce heat in the SMA member to cause the shape change. It may be desirable in some instances to assist an SMA member in transforming shapes, such as from a high-temperature shape to a low-temperature shape. Thus, the coil spring as described herein is configured to load when the SMA member transforms from one shape to another, and to release and apply a return force to the SMA member to assist in transforming back to the previous shape. Therefore, the coil spring integrates the heating aspect of SMA applications with the mechanical aspect of providing a return force. This is advantageous because an SMA apparatus that uses a coil spring configuration as described herein may be lighter weight and have a more compact profile, which is useful in a variety of applications.

One embodiment comprises an apparatus having an SMA member and a coil spring. The SMA member is configured to transform between a first shape and a second shape based on temperature. The coil spring encompasses the SMA member and is mechanically coupled to opposing end of the SMA member. The coil spring is configured to conduct current from a power source to generate a magnetic field that induces heat in the SMA member (the coil spring is electrically isolated from the SMA member). The coil spring is configured to store mechanical energy as the SMA member transforms from the first shape to the second shape when heated to a transition temperature, and to exert force on the SMA member from the mechanical energy to assist the SMA member in transforming from the second shape to the first shape when cooling below the transition temperature.

In another embodiment, the SMA member is configured to twist between the first shape and the second shape based on temperature.

In another embodiment, the SMA member is configured to extend and contract between the first shape and the second shape based on temperature.

In another embodiment, the SMA member comprises an elongated tube formed from SMA material, a first end fitting coupled to a first end of the elongated tube, and a second end fitting coupled to a second end of the elongated tube.

In another embodiment, the coil spring is formed from steel, and a conductive trace is embedded in the coil spring, such as copper.

In another embodiment, the SMA member is comprised of Nickel-Titanium (Ni—Ti) or Nickel-Titanium-Hafnium (Ni—Ti—Hf).

In another embodiment, the apparatus further includes a cooling element configured to fit in a hollow portion of the SMA member to cool the SMA member below the transition temperature.

In another embodiment, the coil spring is insulated, and includes connectors proximate to opposing ends that are configured to electrically couple the coil spring to the power source.

Another embodiment is an actuator comprising an SMA member and a coil spring. The SMA member is comprised of an elongated tube formed from SMA material, and end fittings attached to opposing ends of the elongated tube. The coil spring encompasses the elongated tube, and opposing ends of the coil spring are mechanically coupled to the end fittings. The coil spring is configured to conduct current from a power source to generate a magnetic field that induces heat in the elongated tube. The elongated tube is configured to twist from a first shape to a second shape when heated to a transition temperature. The coil spring is configured to store mechanical energy as the elongated tube twists from the first shape to the second shape. The elongated tube is configured to twist from the second shape to the first shape when cooled below the transition temperature. The coil spring is configured to exert a torsion force on the elongated tube from the mechanical energy to assist the elongated tube in twisting from the second shape to the first shape.

Another embodiment is an actuator comprising an SMA member and a coil spring. The SMA member includes an elongated rod formed from SMA material, and end fittings attached to opposing ends of the elongated rod. The coil spring encompasses the elongated rod, and opposing ends of the coil spring are mechanically coupled to the end fittings. The coil spring is configured to conduct current from a power source to generate a magnetic field that induces heat in the elongated rod. The elongated rod is configured to extend from a first shape to a second shape when heated to a transition temperature. The coil spring is configured to store mechanical energy as the elongated rod extends from the first shape to the second shape. The elongated rod is configured to contract from the second shape to the first shape when cooled below the transition temperature. The coil spring is configured to exert a tension force on the elongated rod from the mechanical energy to assist the elongated rod in contracting from the second shape to the first shape.

Another embodiment is a method of operating an actuator having an elongated tube formed from SMA material with end fittings attached to opposing ends of the elongated tube, and a coil spring that encompasses the elongated tube with opposing ends of the coil spring mechanically coupled to the end fittings. The method includes conducting current through the coil spring to generate a magnetic field that induces heat in the elongated tube, where the elongated tube twists from a first shape to a second shape when heated to a transition temperature. The method includes storing mechanical energy in the coil spring as the elongated tube twists from the first shape to the second shape, where the twisting of the elongated tube of causes a coaxial twisting of the coil spring. The method includes removing the current through the coil spring, where the elongated tube twists from the second shape to the first shape when cooled below the transition temperature. The method also includes exerting a torsion force on the elongated tube from the mechanical energy stored in the coil spring to assist the elongated tube in twisting from the second shape to the first shape.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
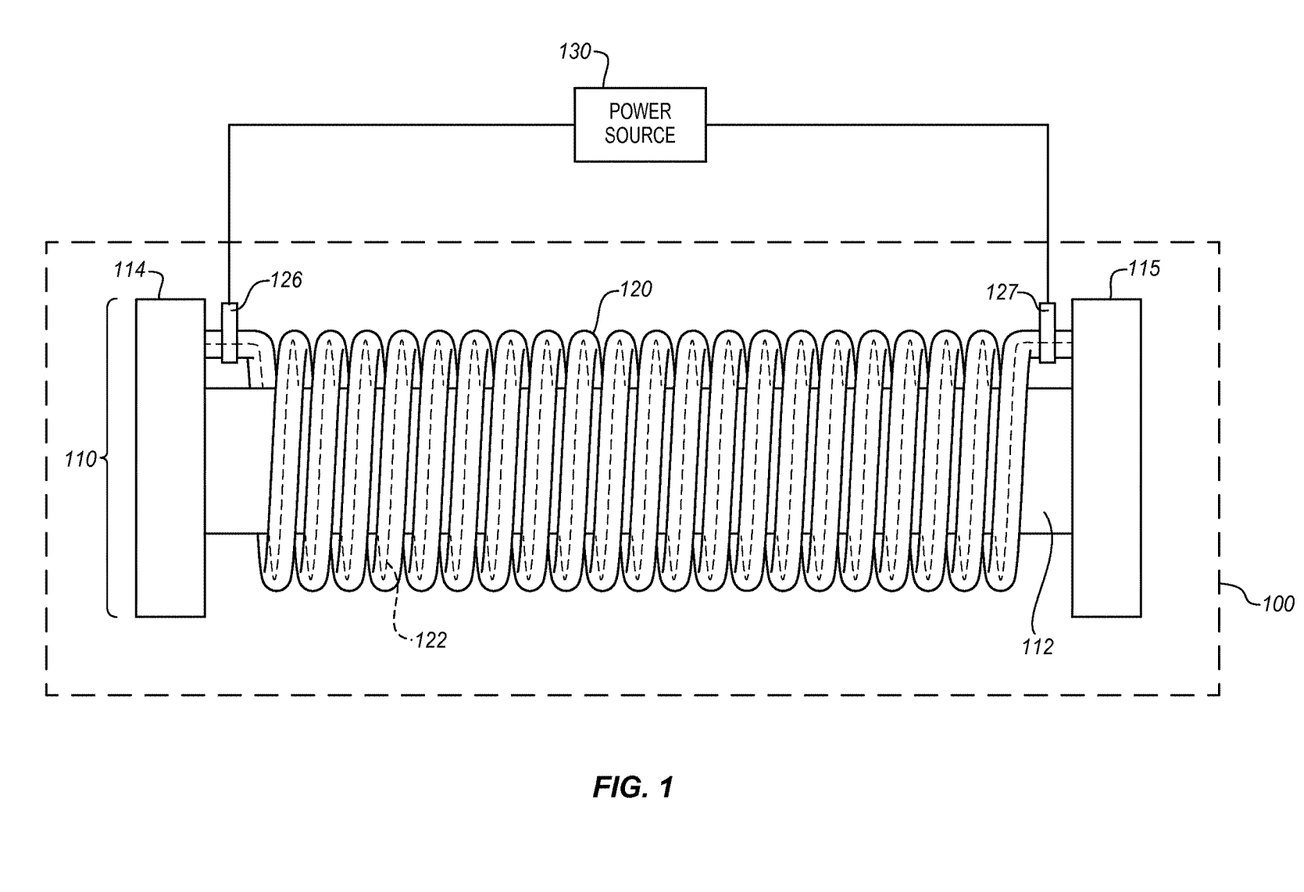
FIG. 1 illustrates an apparatus using SMA materials in an exemplary embodiment.

FIG. 1 illustrates an apparatus 100 using SMA materials in an exemplary embodiment. Apparatus 100 includes an SMA member 110 that includes a component 112 or part formed from SMA materials. For example, component 112 may comprise an elongated tube, a rod (hollow or solid), a shaft (hollow or solid), etc., that is formed from SMA materials, such as Nickel-Titanium (Ni—Ti), Nickel-Titanium-Hafnium (Ni—Ti—Hf), Copper-Aluminum-Nickel (Cu—Al—Ni), etc. SMA member 110 may also include one or more end fittings 114-115 that connect to the ends of component 112. End fitting 114 may be attached to a fixed surface, and end fitting 115 may be configured to attach to a driven unit when SMA member 110 is installed on a machine. Although not shown in FIG. 1, one or both of end fittings 114-115 may include an opening for receiving a fastener or pin, a projection (e.g., a trunnion), a gear, threads, splines, etc.

SMA member 110, and more particularly component 112, has shape-memory characteristics. Therefore, SMA member 110 remembers different shapes depending on the temperature of member 110. SMA member 110 is trained to have a "low-temperature" shape (i.e., martensite form) and a "high-temperature" shape (i.e., austenite form). When SMA member 110 is at lower temperatures (e.g., ambient temperatures), it is trained to conform to its low-temperature shape. When heated to a transition temperature, SMA member 110 transforms to its high-temperature shape. When cooled below the transition temperature, SMA member 110 returns to its low-temperature shape. SMA materials that exhibit shape-memory during both heating and cooling are referred to as having "two-way" shape memory.

SMA member 110 may be trained to rotate or twist axially between the low-temperature shape and the high-temperature shape. Alternatively, SMA member 110 may be trained to extend and contract between the low-temperature shape and the high-temperature shape. SMA member 110 may be trained to conform to different shapes as desired.

When SMA member 110 transitions from its high-temperature shape to its low-temperature shape, it may not fully return to its original martensite shape. Therefore, it may be desirable to mechanically assist the shape transformation. To assist in the shape transformation, apparatus 100 further includes a coil (or helical) spring 120 that is mechanically coupled to SMA member 110. Apparatus 100 has a "coil-over" configuration, where coil spring 120 encompasses SMA member 110 about the outer perimeter of member 110. In other words, coil spring 120 has a series of windings around a hollow core, and SMA member 110 sits within the core. Coil spring 120 is mechanically coupled to opposing ends of SMA member 110. A mechanical coupling between an end of SMA member 110 and coil spring 120 means that a movement of an end of SMA member 110 causes a corresponding movement in coil spring 120. For example, one end of coil spring 120 may be attached to a common surface with respect to an end of SMA member 110, while the other end of coil spring 120 may be attached to an end fitting 114-115. In another example, one end of coil spring 120 may be attached to end fitting 114, and the other end of coil spring 120 may be attached to end fitting 115. In either case, there is a mechanical coupling between coil spring 120 and SMA member 110 such that a movement or shape transformation of SMA member 110 acts to load coil spring 120. Although coil spring 120 is mechanically coupled to SMA member 110, it is electrically isolated from SMA member 110, which is described further below.

In addition to providing a mechanical-assist to SMA member 110, coil spring 120 also acts as an induction coil for SMA member 110. Coil spring 120 is configured to conduct current to generate a magnetic field that induces heat in SMA member 110. For instance, coil spring 120 is shown in FIG. 1 as having an electrical conductor 122 that extends through the length of coil spring 120 and is able to conduct current. If current is passed through conductor 122, then the windings of coil spring 120 act as an induction coil for induction heating. Coil spring 120 may be formed from a conductive material (e.g., a metal), and conductor 122 may represent the actual conductive properties of coil spring 120.

Conductor 122 may also represent a metal having a higher conductivity than the material used for coil spring 120, that is embedded, infused, or otherwise formed in or on the windings of coil spring 120.

Figure 2:
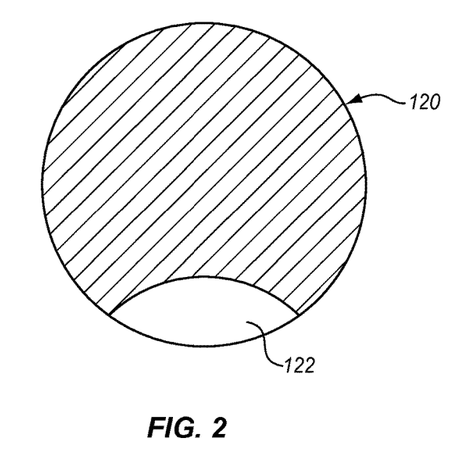
FIG. 2 is a cross-sectional view of a coil spring in an exemplary embodiment.

FIG. 2 is a cross-sectional view of coil spring 120 in an exemplary embodiment. The hatched portion of coil spring 120 represents the material used to form the mechanical portion of spring 120. Springs are typically made from a highly-elastic material, such as steel or some other material that exhibits the rigidity and elasticity desired for an application. Although springs may be made from metal that have conductive properties, the conductive properties of the highly-elastic material may not be sufficient for an induction coil. Therefore, conductor 122 represents the conductive portion of coil spring 120. To form conductor 122, a material may be embedded, infused, or otherwise formed in or on coil spring 120. In one example, a copper trace or another highly-conductive material may be embedded or impregnated into an interior surface of coil spring 120 (as shown in FIG. 2), or may be attached to an exterior surface of coil spring 120. In another example, copper (or another highly-conductive metal) material may be fabricated or "mixed" with the other material(s) that form coil spring 120 to increase its conductive properties.

In FIG. 1, coil spring 120 is electrically isolated from SMA member 110. To do so, an attachment point(s) between coil spring 120 and end fittings 114 or 115 may be insulated, or the length of coil spring 120 may be coated with an insulating material. Coil spring 120 includes connectors 126-127 at opposing ends that are configured to couple conductor 122 to a power source 130. Power source 130 is able to pass an alternating current (AC) through coil spring 120, which acts as an induction coil. As the current passes through the windings of conductor 122 in coil spring 120, a magnetic field is generated. SMA member 110 is located within the magnetic field of the induction coil, and eddy currents are induced in SMA member 110. The eddy currents flow against the electrical resistivity of material used to form SMA member 110, which generates localized heat within SMA member 110. This is referred to as induction heating, where coil spring 120 is able to induce heat into SMA member 110 without direct contact. It is desirable to apply substantially uniform heat along the length of SMA member 110. Therefore, the length of coil spring 120 may correspond (e.g., be substantially equal) with the length of SMA member 110.

In an operating scenario of apparatus 100, it is assumed that SMA member 110 has a low-temperature shape at an initial operating temperature. When power source 130 passes a current through coil spring 120 (i.e., through conductor 122), the current generates a magnetic field that heats SMA member 110. As the temperature of SMA member 110 reaches its transition temperature, the shape of SMA member 110 transforms to its high-temperature shape. For example, SMA member 110 may twist, extend, contract, or otherwise change shapes. Heating may be controlled in a closed-loop fashion to vary the heating rate (via amplifier). Controlled heating can close the position feedback-loop to allow SMA member 110 to move to its high-temperature shape and hold this shape within a tolerance. The transformation from the low-temperature shape to the high-temperature shape acts to load coil spring 120 with mechanical energy. If power source 130 stops the current flow, then SMA member 110 will cool below the transition temperature and transform from the high-temperature shape to the low-temperature shape. The mechanical energy stored in coil spring 120 applies a force to SMA member 110 that assists the transition from the high-temperature shape to the low-temperature shape. Therefore, SMA member 110 is more likely to conform to its "original" low-temperature shape with the assistance from coil spring 120.

Figure 3:
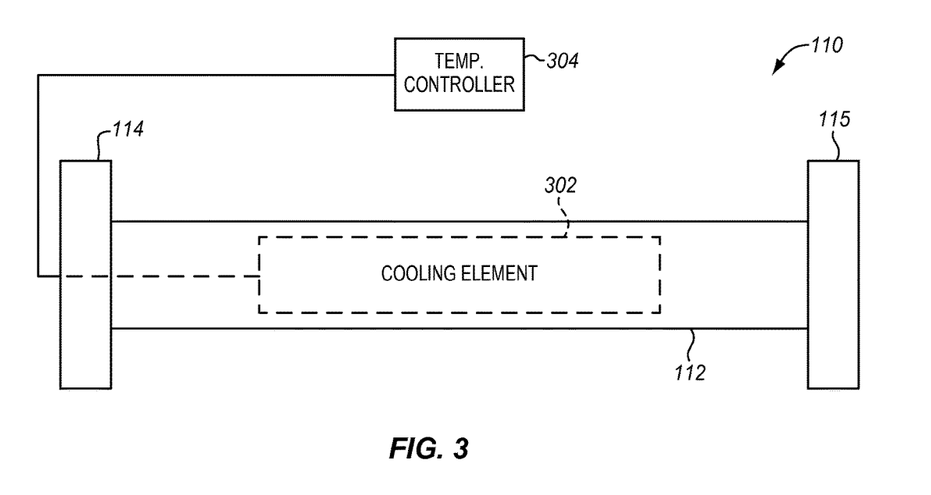
FIG. 3 illustrates a cooling system in an exemplary embodiment.

When transitioning from the high-temperature shape to the low-temperature shape, a cooling system may be used to control how fast SMA member 110 changes temperature. FIG. 3 illustrates a cooling system in an exemplary embodiment. The cooling system in this embodiment includes a cooling element 302 connected to a temperature controller 304. If SMA member 110 is hollow, then cooling element 302 is configured to fit within the hollow portion of SMA member 110. Temperature controller 304 may then selectively control the temperature of cooling element 302 to accelerate a temperature decrease in SMA member 110. The cooling system may additionally or alternatively use other methods of cooling, such as forced air cooling, liquid cooling, natural convection, conduction, and other methods. The cooling system may also include one or more fans that blow air over coil spring 120 to create forced convection.

SMA materials that are trained for two-way memory have multiple applications. One particular application is as an actuator for imparting movement to a driven unit, such as a unit on an aircraft. As an example, an actuator for extending and retracting flaps on an aircraft typically includes an electric motor. However, two-way SMA may be used instead in the actuator for extending and retracting flaps.

Figure 4:
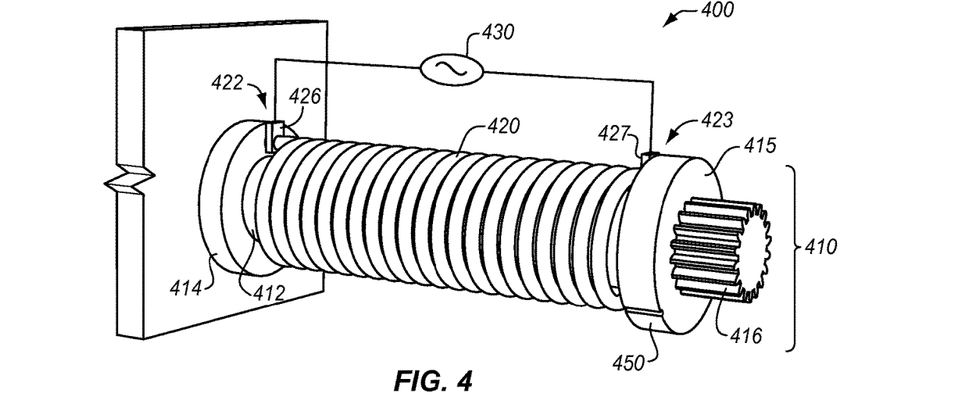
FIGS. 4-6 illustrate an SMA actuator that generates a twisting force in an exemplary embodiment.
Figure 5:
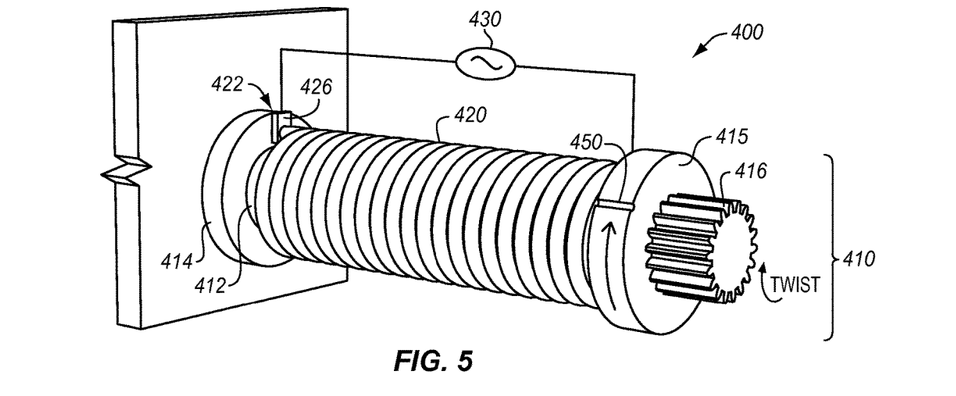
Figure 6:
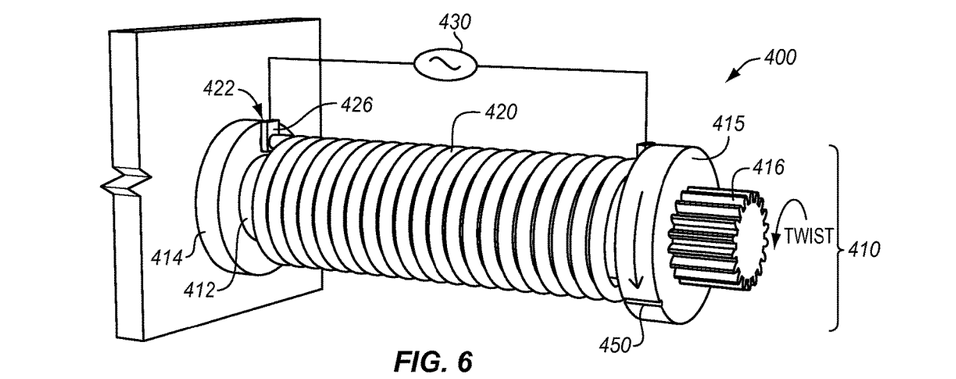

FIGS. 4-6 illustrate an SMA actuator 400 that generates a twisting force in an exemplary embodiment. In FIG. 4, actuator 400 includes an SMA member 410 and a coil spring 420. SMA member 410 comprises an elongated tube 412 formed from an SMA material. An end fitting 414 is attached or affixed to one end of elongated tube 412, and an end fitting 415 is attached to the other end of elongated tube 412. End fitting 414, in this embodiment, is also attached to a fixed surface, although it may be attached to other mechanisms in other embodiments. End fitting 415 includes a driving portion 416 that is configured to interface with a driven unit not shown in FIG. 4. Coil spring 420 is a torsion spring in this embodiment, with one end 422 attached to end fitting 414 and the other end 423 attached to end fitting 415.

Coil spring 420 may be formed from a metal, such as steel, that is able to conduct a current. As in the above embodiment, a conductive material (e.g., Cu) may be embedded or infused in coil spring 420 to form an electrical conductor that extends through the length of coil spring 420 to improve its conductive properties. Coil spring 420 may be coated with an insulating material so that it is electrically isolated from SMA member 410. Coil spring 420 includes an electrical connector 426 proximate to end 422, and an electrical connector 427 proximate to end 423.

Figure 10:
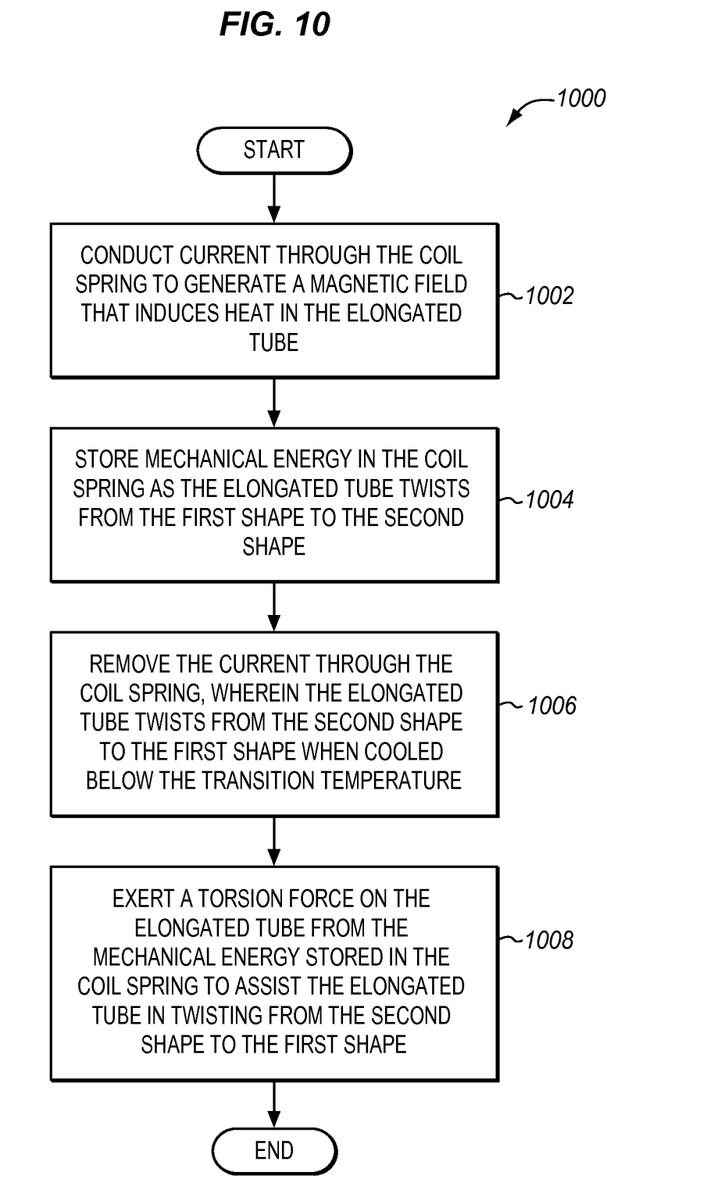
FIG. 10 is a flow chart illustrating a method for operating an actuator in an exemplary embodiment.

FIG. 10 is a flow chart illustrating a method 100 for operating actuator 400 in an exemplary embodiment. The steps of method 1000 will be described with respect to actuator 400 of FIG. 4, although one skilled in the art will understand that the methods described herein may be performed for other systems not shown. The steps of the methods described herein are not all inclusive and may include other steps not shown. In this embodiment, tube 412 in FIG. 4 has been trained to twist about an axis between a low-temperature shape and a high-temperature shape. FIG. 4 illustrates the low-temperature shape of tube 412, which may be considered a neutral position for tube 412 under ambient temperatures, as indicated by reference mark 450. To cause actuation, current is conducted through coil spring 420 by a power source 430 (step 1002). The current through coil spring 420 induces heat in tube 412 (i.e., induction heating), which causes a transition from the low-temperature shape to the high-temperature shape as illustrated in FIG. 5. The transformation from the low-temperature shape to the high-temperature shape in tube 412 is a twisting motion, which imparts movement to the driving portion 416 of end fitting 415. This twisting motion of tube 412 also causes coil spring 420 to rotate or twist (clockwise in FIG. 5) coaxially with tube 412, which stores mechanical energy in coil spring 420 (step 1004 of FIG. 10). The mechanical energy stored in coil spring 420 produces an axial force (referred to as a return force) that opposes the twisting motion of tube 412.

When power source 430 removes the current through coil spring 420 (step 1006), heat is no longer induced in tube 412 and tube 412 will cool. As tube 412 cools below the transition temperature, it transforms from the high-temperature shape to the low-temperature shape as shown in FIG. 6. The transformation from the high-temperature shape to the low-temperature shape in tube 412 is again a twisting motion in the reverse direction (counterclockwise in FIG. 6). Coil spring 420 exerts a torsion force or return force to tube 412 in this reverse direction using the stored mechanical energy (step 1008 of FIG. 10), which assists the transformation from the high-temperature shape to the low-temperature shape. Coil spring 420 therefore aids in tube 412 returning to its neutral position. It is possible for SMAs to not fully return to their original martensite shape (even with two-way memory) when cooled. Depending on what type of loading it underwent, tube 412 may need a slight "boost" to return to its low-temperature shape. Coil spring 420 therefore aids in tube 412 returning to its neutral position. The spring load should be lower than the operating load at all operating ranges.

Figure 7:
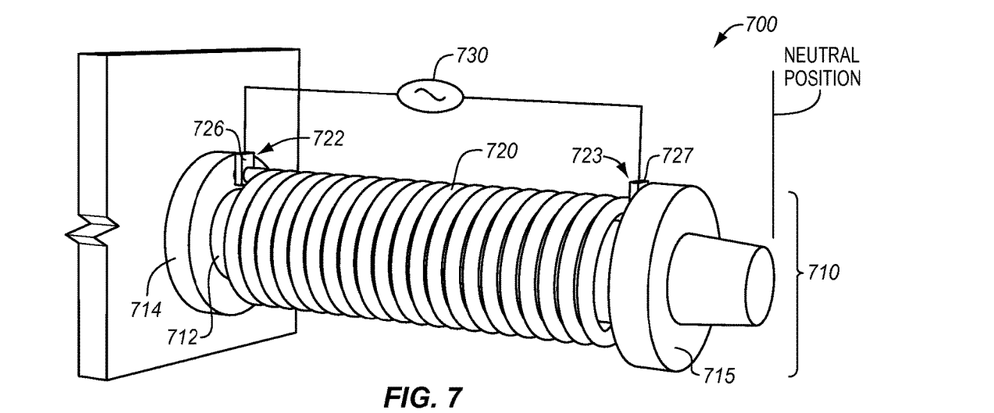
FIGS. 7-9 illustrate an SMA actuator that generates an extension force in an exemplary embodiment.
Figure 8:
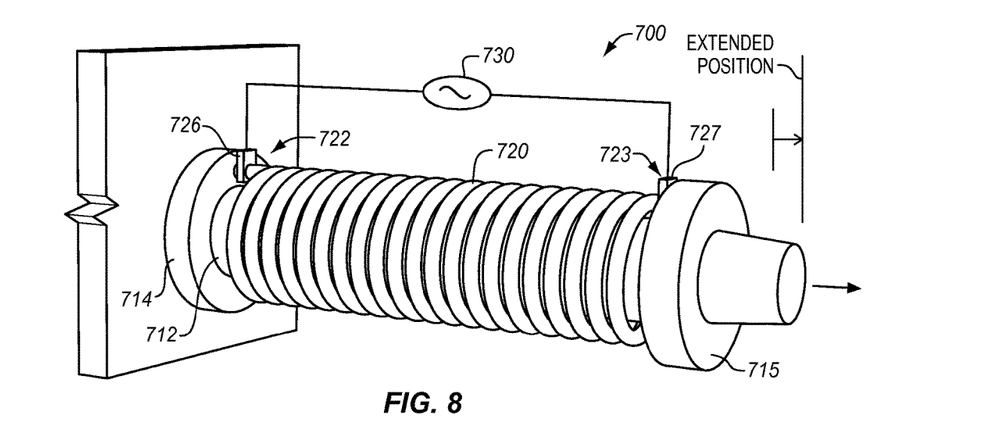
Figure 9:
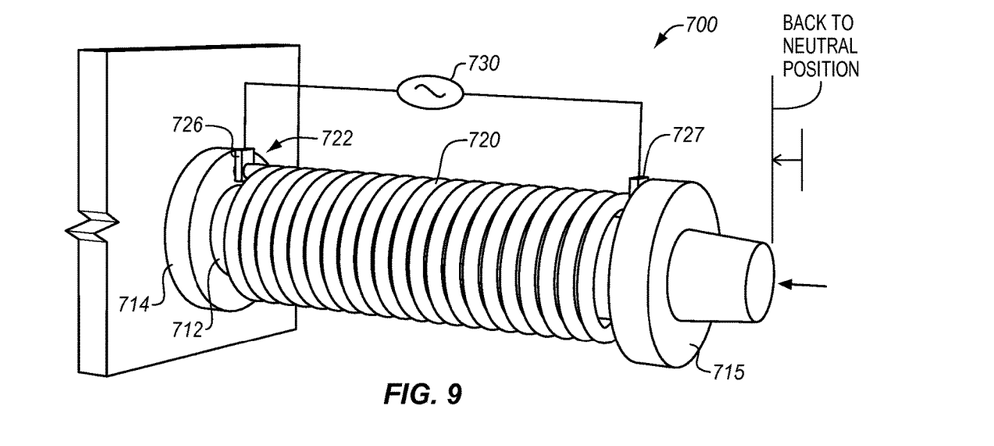

FIGS. 7-9 illustrate an SMA actuator 700 that generates an extension force in an exemplary embodiment. In FIG. 7, actuator 700 includes an SMA member 710 and a coil spring 720. SMA member 710 comprises an elongated rod 712 formed from an SMA material. An end fitting 714 is attached or affixed to one end of rod 712, and an end fitting 715 is attached to the other end of rod 712. End fitting 714, in this embodiment, is also attached to a fixed surface, although it may be attached to other mechanisms in other embodiments. End fitting 715 is configured to interface with a mechanism not shown in FIG. 7 to drive the mechanism to the right in FIG. 7. Coil spring 720 is a tension spring in this embodiment, with one end 722 of coil spring 720 attached to end fitting 714 and the other end 723 of coil spring 720 attached to end fitting 715.

Coil spring 720 may be formed from a metal, such as steel, that is able to conduct a current. As in the above embodiments, a conductive material (e.g., Cu) may be embedded or infused in coil spring 720 to form an electrical conductor that extends through the length of coil spring 720 to improve its conductive properties. Coil spring 720 may be coated with an insulating material so that it is electrically isolated from SMA member 710. Coil spring 720 includes an electrical connector 726 proximate to end 722, and an electrical connector 727 proximate to end 723.

In this embodiment, rod 712 has been trained to extend and contract between a low-temperature shape and a high-temperature shape. FIG. 7 illustrates the low-temperature shape of rod 712, which may be considered a neutral position for rod 712 under ambient temperatures. To cause actuation, current is conducted through coil spring 720 by a power source 730. The current through coil spring 720 induces heat in rod 712, which causes a transition from the low-temperature shape to the high-temperature shape as illustrated in FIG. 8. The transformation from the low-temperature shape to the high-temperature shape in rod 712 is a linear motion, which forces end fitting 715 to the right in FIG. 8. This linear motion of rod 712 also causes coil spring 720 to extend, which stores mechanical energy in coil spring 720. The mechanical energy stored in coil spring 720 produces a force (referred to as a return force) that opposes the extension of rod 712.

When power source 730 removes the current through coil spring 720, heat is no longer induced in rod 712 and rod 712 will cool. As rod 712 cools below the transition temperature, it transforms from the high-temperature shape to the low-temperature shape as shown in FIG. 9. The transformation from the high-temperature shape to the low-temperature shape in rod 712 is a contracting motion in the reverse direction. Coil spring 720 applies a return force to rod 712 linearly in the reverse direction using the stored mechanical energy, which assists the transformation from the high-temperature shape to the low-temperature shape. Coil spring 720 therefore aids in rod 712 returning to its neutral position.

Although specific embodiments were described herein, the scope is not limited to those specific embodiments. Rather, the scope is defined by the following claims and any equivalents thereof.

The invention claimed is:

1. An apparatus comprising:
    a Shape-Memory Alloy (SMA) member configured to transform between a first shape and a second shape based on temperature; and
    a coil spring that encompasses the SMA member and is mechanically coupled to opposing ends of the SMA member;
    the coil spring is configured to conduct current from a power source to generate a magnetic field that induces heat in the SMA member, wherein the coil spring is electrically isolated from the SMA member;
    the coil spring is configured to store mechanical energy as the SMA member transforms from the first shape to the second shape when heated to a transition temperature, and to exert force on the SMA member from the mechanical energy to assist the SMA member in transforming from the second shape to the first shape when cooling below the transition temperature.

2. The apparatus of claim 1 wherein:
    the SMA member is configured to twist between the first shape and the second shape based on temperature.

3. The apparatus of claim 1 wherein:
    the SMA member is configured to extend and contract between the first shape and the second shape based on temperature.

4. The apparatus of claim 1 wherein the SMA member comprises:
    an elongated tube formed from SMA material;
    a first end fitting coupled to a first end of the elongated tube; and
    a second end fitting coupled to a second end of the elongated tube.

5. The apparatus of claim 1 wherein:
    the coil spring is formed from steel; and
    a conductive trace is embedded in the coil spring.

6. The apparatus of claim 5 wherein:
    the conductive trace is comprised of copper.

7. The apparatus of claim 1 wherein:
    the SMA member is comprised of Nickel-Titanium (Ni—Ti).

8. The apparatus of claim 1 wherein:
    the SMA member is comprised of Nickel-Titanium-Hafnium (Ni—Ti—Hf).

9. The apparatus of claim 1 further comprising:
a cooling element configured to fit in a hollow portion of the SMA member to cool the SMA member below the transition temperature.

10. The apparatus of claim 1 wherein:
the coil spring is insulated, and includes connectors proximate to opposing ends of the coil spring that are configured to electrically couple the coil spring to the power source.

11. An actuator comprising:
a Shape-Memory Alloy (SMA) member comprising an elongated tube formed from SMA material, and end fittings attached to opposing ends of the elongated tube; and
a coil spring that encompasses the elongated tube, wherein opposing ends of the coil spring are mechanically coupled to the end fittings;
the coil spring is configured to conduct current from a power source to generate a magnetic field that induces heat in the elongated tube, wherein the coil spring is electrically isolated from the elongated tube;
the elongated tube is configured to twist from a first shape to a second shape when heated to a transition temperature;
the coil spring is configured to store mechanical energy as the elongated tube twists from the first shape to the second shape;
the elongated tube is configured to twist from the second shape to the first shape when cooled below the transition temperature;
the coil spring is configured to exert a torsion force on the elongated tube from the mechanical energy to assist the elongated tube in twisting from the second shape to the first shape.

12. The actuator of claim 11 wherein:
the coil spring is formed from steel; and
a conductive trace is embedded in the coil spring to form an electrical conductor that extends along the length of the coil spring.

13. The actuator of claim 12 wherein:
the conductive trace is comprised of copper.

14. The actuator of claim 11 wherein:
the elongated tube is comprised of Nickel-Titanium (Ni—Ti).

15. The actuator of claim 11 further comprising:
a cooling element configured to fit in a hollow portion of the elongated tube to cool the elongated tube below the transition temperature.

16. An actuator comprising:
a Shape-Memory Alloy (SMA) member comprising an elongated rod formed from SMA material, and end fittings attached to opposing ends of the elongated rod; and
a coil spring that encompasses the elongated rod, wherein opposing ends of the coil spring are mechanically coupled to the end fittings;
the coil spring is configured to conduct current from a power source to generate a magnetic field that induces heat in the elongated rod, wherein the coil spring is electrically isolated from the elongated rod;
the elongated rod is configured to extend from a first shape to a second shape when heated to a transition temperature;
the coil spring is configured to store mechanical energy as the elongated rod extends from the first shape to the second shape;
the elongated rod is configured to contract from the second shape to the first shape when cooled below the transition temperature;
the coil spring is configured to exert a tension force on the elongated rod from the mechanical energy to assist the elongated rod in contracting from the second shape to the first shape.

17. The actuator of claim 16 wherein:
the coil spring is formed from steel; and
a conductive trace is embedded in the coil spring to form an electrical conductor that extends along the length of the coil spring.

18. The actuator of claim 17 wherein:
the conductive trace is comprised of copper.

19. The actuator of claim 16 wherein:
the elongated rod is comprised of Nickel-Titanium (Ni—Ti).

20. A method of operating an actuator having an elongated tube formed from Shape-Memory Alloy (SMA) material with end fittings attached to opposing ends of the elongated tube, and a coil spring that encompasses the elongated tube with opposing ends of the coil spring mechanically coupled to the end fittings, the method comprising:
conducting current through the coil spring to generate a magnetic field that induces heat in the elongated tube, wherein the elongated tube twists from a first shape to a second shape when heated to a transition temperature;
storing mechanical energy in the coil spring as the elongated tube twists from the first shape to the second shape, wherein the twisting of the elongated tube of causes a coaxial twisting of the coil spring;
removing the current through the coil spring, wherein the elongated tube twists from the second shape to the first shape when cooled below the transition temperature; and
exerting a torsion force on the elongated tube from the mechanical energy stored in the coil spring to assist the elongated tube in twisting from the second shape to the first shape.

21. The method of claim 20 wherein conducting the current through the coil spring comprises:
conducting the current through a conductive trace embedded in the coil spring.

22. The method of claim 20 further comprising:
cooling the SMA member below the transition temperature with a cooling element that fits in a hollow portion of the elongated tube.

* * * * *